UNITED STATES PATENT OFFICE.

ADELHEID SCHULZ, OF NEW YORK, N. Y.

INSECTICIDE.

No. 817,194.     Specification of Letters Patent.     Patented April 10, 1906.

Application filed October 3, 1905. Serial No. 281,138.

*To all whom it may concern:*

Be it known that I, ADELHEID SCHULZ, a subject of the German Emperor, residing at New York, in the county of New York and State of New York, have invented certain new and useful Improvements in Insecticide and Germicide Compounds, of which the following is a specification.

The present invention pertains to improvements in insecticide compounds particularly adapted to kill bedbugs. It has been found that the new compound destroys the bugs instantaneously, leaving only the shell.

The new compound consists of the following ingredients: one part borax, one part talcum, and two parts sesquicarbonate of ammonia. The three substances are thoroughly mixed and form a powder which when strewn over bugs or like insects destroy the latter instantaneously and when deposited in the crevices of beds destroy the germs.

What I claim, and desire to secure by Letters Patent, is—

1. An improved insecticide and germicide compound, containing borax, talcum and sesquicarbonate of ammonia, substantially and for the purpose as specified.

2. An improved insecticide and germicide compound, containing one part borax, one part talcum and two parts sesquicarbonate of ammonia, substantially and for the purpose as specified.

In testimony whereof I affix my signature in presence of two witnesses.

ADELHEID SCHULZ.

Witnesses:
JOHN T. CARMODY,
MAX E. ORDMANN.